(12) United States Patent
Nagawade et al.

(10) Patent No.: US 9,356,974 B2
(45) Date of Patent: May 31, 2016

(54) SYSTEMS AND METHODS FOR ESTABLISHING A WI-FI DISPLAY (WFD) SESSION

(71) Applicant: Marvell World Trade Ltd., St. Michael (BB)

(72) Inventors: Deepak Shahaji Nagawade, Aundh (IN); Su Khiong Yong, Santa Clara, CA (US); Sarang Shrikrishna Wagholikar, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 610 days.

(21) Appl. No.: 13/737,431

(22) Filed: Jan. 9, 2013

(65) Prior Publication Data

US 2013/0185447 A1 Jul. 18, 2013

Related U.S. Application Data

(60) Provisional application No. 61/585,898, filed on Jan. 12, 2012, provisional application No. 61/586,643, filed on Jan. 13, 2012.

(51) Int. Cl.
*G06F 15/173* (2006.01)
*H04L 29/06* (2006.01)
*H04W 8/00* (2009.01)
*H04L 29/08* (2006.01)

(52) U.S. Cl.
CPC ............ *H04L 65/1069* (2013.01); *H04L 69/32* (2013.01); *H04W 8/005* (2013.01); *H04L 67/16* (2013.01)

(58) Field of Classification Search
CPC ......... H04L 69/32; H04L 69/16; H04L 29/06; H04L 65/1069; H04L 67/16; H04W 8/005; H04W 76/00; H04W 76/021; H04W 48/16
USPC ................... 709/203, 227, 228; 370/331, 310
See application file for complete search history.

(56) References Cited

U.S. PATENT DOCUMENTS

| 2007/0011335 | A1 | 1/2007 | Burns et al. |
| 2007/0275683 | A1 | 11/2007 | Songer et al. |
| 2010/0088370 | A1* | 4/2010 | Wu ........................ H04W 4/02 709/203 |
| 2011/0103264 | A1* | 5/2011 | Wentink ................ H04W 8/005 370/255 |
| 2011/0107388 | A1* | 5/2011 | Lee et al. ........................ 725/118 |
| 2011/0149806 | A1* | 6/2011 | Verma et al. .................. 370/255 |
| 2011/0188391 | A1* | 8/2011 | Sella et al. ..................... 370/252 |

(Continued)

OTHER PUBLICATIONS

Wi-Fi Alliance Member Symposium, Apr. 1, 2011, XP055046396, Retrieved from the Internet: URL: http://www.wi-fi.org/files/20110421-China-Symposium-full-merge.pdf.*

(Continued)

*Primary Examiner* — Frantz Jean (57) ABSTRACT

Systems, methods, apparatus, and techniques are provided for establishing an application layer communications session over a layer 2 (L2) communications connection. In particular, a discovery request frame is transmitted from a first device. A discovery response frame is received at the first device, where the discovery response frame is transmitted from a second device in response to having received the discovery request frame. An application layer communications session is established between the first device and the second device while maintaining an existing L2 communications connection between the first device and the second device.

20 Claims, 4 Drawing Sheets

(56) References Cited

U.S. PATENT DOCUMENTS

| | | | |
|---|---|---|---|
| 2012/0243524 A1* | 9/2012 | Verma et al. ................. | 370/338 |
| 2012/0281577 A1* | 11/2012 | Winter ................... | H04L 12/12 |
| | | | 370/252 |
| 2013/0166759 A1* | 6/2013 | Rajamani ............ | H04W 76/023 |
| | | | 709/227 |
| 2014/0156836 A1* | 6/2014 | Demmer ................. | H04W 4/02 |
| | | | 709/224 |

OTHER PUBLICATIONS

International Search Report and Written Opinion dated Apr. 19, 2013 in International Application No. PCT/US2013/020793.

"Wi-Fi Alliance Member Symposium", Retrieved from the Internet: URL:http://www.wi-fi.org/files/20110421_China_Symposia_full_merge.pdf [retrieved on Dec. 3, 2012].

* cited by examiner

SYSTEMS AND METHODS FOR ESTABLISHING A WI-FI DISPLAY (WFD) SESSION

CROSS-REFERENCE TO RELATED APPLICATIONS

This patent document claims the benefit under 35 U.S.C. §119(e) of U.S. Provisional Application No. 61/585,898, filed Jan. 12, 2012, and U.S. Provisional Application No. 61/586,643, filed Jan. 13, 2012. Each of the U.S. Provisional Application Nos. 61/585,898 and 61/586,643 is hereby incorporated by reference in its respective entirety.

FIELD OF USE

This disclosure relates to a wireless fidelity (Wi-Fi) display, also referred to as WFD, for enabling and sustaining a secure connection between multimedia Wi-Fi devices for the transmission of audio and video streams.

BACKGROUND OF THE DISCLOSURE

WFD technology enables sharing of audio and video content between devices while leveraging existing Wi-Fi network infrastructure. Even when used among devices in direct proximity to each other, Wi-Fi technology removes constraints related to matching connector types and ports on the devices and other burdens of cable-based connections. Wi-Fi display technology, in particular, will be used in a wide range of consumer and commercial settings, and the functionality for Wi-Fi display will be included on a wide range of devices and displays, including personal computers, digital televisions, set-top boxes, entertainment and conference room projectors, laptop and tablet computers, and mobile phones.

WFD will be used to enhance the sharing of audio and video content by enabling and sustaining a secure connection between multimedia Wi-Fi devices for the transmission of audio and video streams. In contrast to standard Wi-Fi connections, which are typically maintained at the layer 2 (L2) level using peer-to-peer (P2P) or tunneled direct link setup (TDLS) links, WFD connections are maintained at the application-layer (or layer 3 (L3) level). According to some approaches, WFD connections are established over existing P2P or TDLS connections by first tearing down an existing L2 connection and then establishing a new L2 connection and a WFD connection.

SUMMARY OF THE DISCLOSURE

Systems, methods, apparatus, and techniques are provided for establishing an application layer communications session over a L2 communications connection. In particular, a discovery request frame is transmitted from a first device. A discovery response frame is received at the first device, where the discovery response frame is transmitted from a second device in response to having received the discovery request frame. An application layer communications session is established between the first device and the second device while maintaining an existing L2 communications connection between the first device and the second device.

In some arrangements, the L2 communications connection is a P2P communications connection, while in some other arrangements, the L2 communications connection is a TDLS communications connection. In some arrangements, the application layer communications session is a WFD communications session. In some arrangements, the discovery request frame is a WFD Discovery Request frame and the discovery response frame is a WFD Discovery Response frame, while in some other arrangements, the discovery request frame is a Service Discovery request frame and the discovery response frame is a Service Discovery response frame.

In some arrangements, the first device and the second device are each Wi-Fi enabled and WFD enabled. In some arrangements, the first device acts as a Wi-Fi display source and the second device acts as Wi-Fi display sink. In some arrangements, the first device acts a group owner (GO) of the application layer communications session. In some arrangements, the WFD Discovery Response frame comprises a WFD Information Element (IE), the WFD IE describing at least one capability of the second device.

BRIEF DESCRIPTION OF THE FIGURES

The above and other aspects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Disclosed herein are techniques for establishing an L3 connection over an existing (i.e., already established) L2 connection. In an arrangement, the disclosed techniques may be applied to establish an L3 WFD connection over an existing L2 P2P or TDLS connection. In particular, the L3 connection is established without any need to first tear down the existing L2 connection and then establish a new L3 connection, thereby saving system resources and configuration time.

Figure 1:
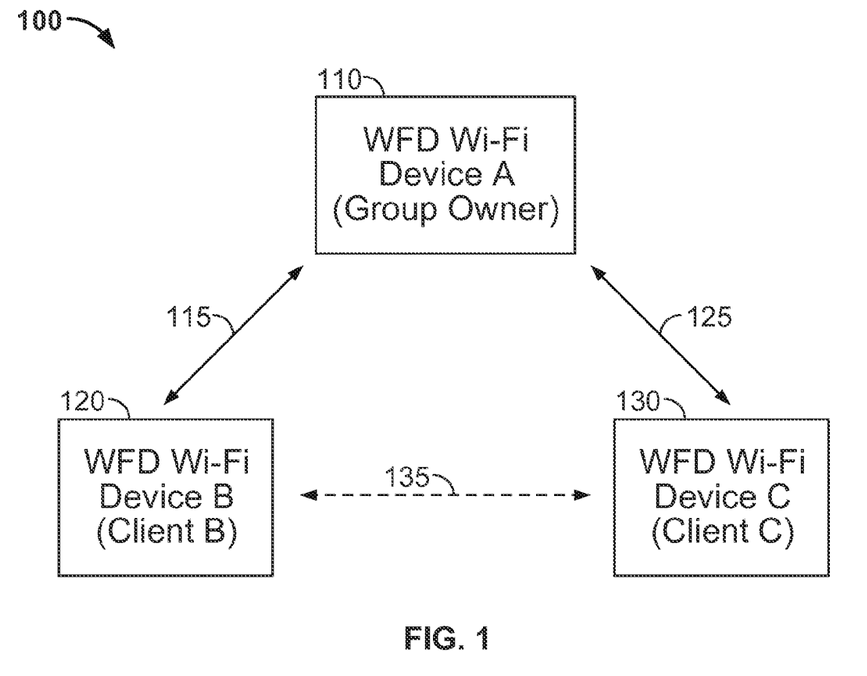
FIG. 1 depicts an exemplary Wi-Fi network in accordance with an arrangement.

FIG. 1 depicts an exemplary Wi-Fi network in accordance with an arrangement. Specifically, network 100 includes WFD Wi-Fi device A 110, WFD Wi-Fi device B 120, and WFD Wi-Fi device C 130. Each of the devices 110, 120, and 130 may be, e.g., a portable computer, a mobile phone, or another type of wireless device. At the outset of communications, none of the devices depicted in FIG. 1 (i.e., device A 110, device B 120, and device C 130) need inherently exhibit any logical or physical hierarchy in relation to the other devices, e.g., none of the devices depicted in FIG. 1 need be a fixed access point or have more or less functionality than any other device depicted in FIG. 1.

In one arrangement, the network 100 operates as a L2 P2P network. In this arrangement, the device A 110 (chosen arbitrarily from among the devices depicted in FIG. 1) is nominated as a GO. The device A 110, as the GO, then communicates directly with the device B 120 and the device C 130 via P2P links 115 and 125, respectively. The P2P network has potentially inefficiency. In particular, transmission between devices other than the GO must nevertheless be forwarded through the GO. For example, if device 120 wishes to transmit data to device 130, this data must pass through device 110 (as the GO). This results in latency, particularly, when the GO acts as a GO for a large number of client devices, and additional bandwidth consumption.

Thus, in an arrangement, the GO forwards setup information so that non-GO devices may communicate directly with each other via a TDLS protocol. For example, rather than rely on the device A 110 to forward communications between the device B 120 and the device C 130, the device B 120 and the device C 130 may instead communicate directly to each other via TDLS link 135.

Figure 2:
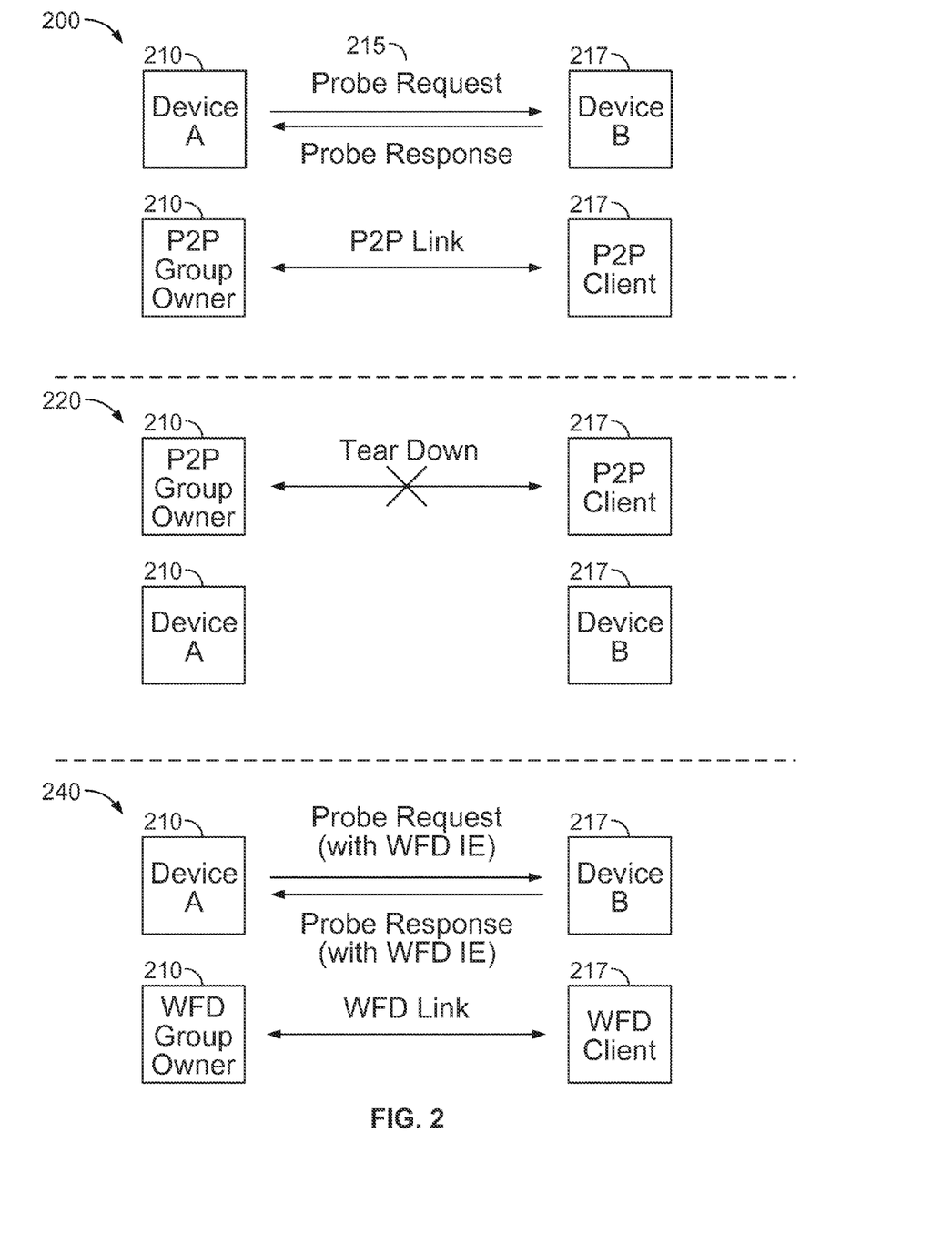
FIG. 2 depicts an illustrative process for establishing a WFD session between client devices subsequent to an established P2P connection between those devices in accordance with an arrangement.

FIG. 2 depicts an illustrative process for establishing a WFD session between client devices subsequent to an established P2P connection between those devices in accordance with an arrangement. At the outset of stage 200, a device A 210 and a device B 217 operate asynchronously, i.e., without an established link between the devices. Further, the device A 210 and the device B 217 are each WFD-enabled even if running a lower level L2 communications protocol, such as P2P or TDLS. The device A 210 sends a P2P probe request over link 215 which is received by the device B 217. The probe request may request information specifically from the device B or may generally request information from all access points in the area. The requested information includes supported data rates and other information, but does not relate to WFD IEs, as the probe request is a P2P probe request. Upon receiving the probe request, the device B 217 sends a probe response to the device A 210, from which a P2P communications link 215 between the device A 210 and the device B 217 is established. As depicted in FIG. 2, the device A 210 then acts as the P2P GO and the device B 217 acts as the P2P client. In an arrangement, the device A 210 and the device B 217 correspond to the device A 110 and the device B 120, respectively, of FIG. 1.

At stage 220, the device A 210 seeks to initiate a WFD link with the device B 217. To do so, the device A 210 sends a teardown request to the device B 217, and the P2P link 215, previously established at the stage 200, is terminated. Thus, the device A 210 loses its status as GO and the device B 217 loses its status as a P2P client.

At stage 240, the device A 210 sends a WFD probe request over link 215 which is received by the device B 217. The WFD probe request is similar to a P2P probe request but includes a WFD IE. Upon receiving the WFD probe request, the device B 217 sends a WFD probe response, which also includes a WFD IE, to the device A 210, from which a WFD communications link 215 between the device A 210 and the device B 217 is established. The device A 210 acts as the WFD GO and the device B 217 acts as the WFD client.

As would be understood by one of ordinary skill in the art, based on the disclosure and teachings herein, that device A 210 initiated the P2P probe request at the stage 200 does not mean that the device A 210 must also initiate the WFD probe request at the stage 240. In general, either the device A 210 or the device B 217 may initiate one or both of the P2P probe request and the WFD probe request.

As would be understood by one of ordinary skill in the art, based on the disclosure and teachings herein, a similar process may be used to establish a WFD session between client devices subsequent to an established TDLS connection between those devices. In particular, at the stage 200, a TDLS probe request may be sent instead of a P2P probe request and a TDLS probe response may be sent instead of a P2P probe response.

Thus, according to the process 200, when two devices that have an established L2 TDLS or P2P connection between are to start a WFD session, the link supporting the existing TDLS or P2P L2 connection may be torn down and a new L2 connection started before the WFD session is started. This might affect existing WFD sessions or other applications using the existing link, and this may lead to wastage of resources and time spent in reestablishing the underlying L2 link. In contrast, FIGS. 3 and 4 describe techniques whereby an existing L2 P2P or TDLS link may be reused (i.e., without any tearing down) for the WFD session.

Figure 3:
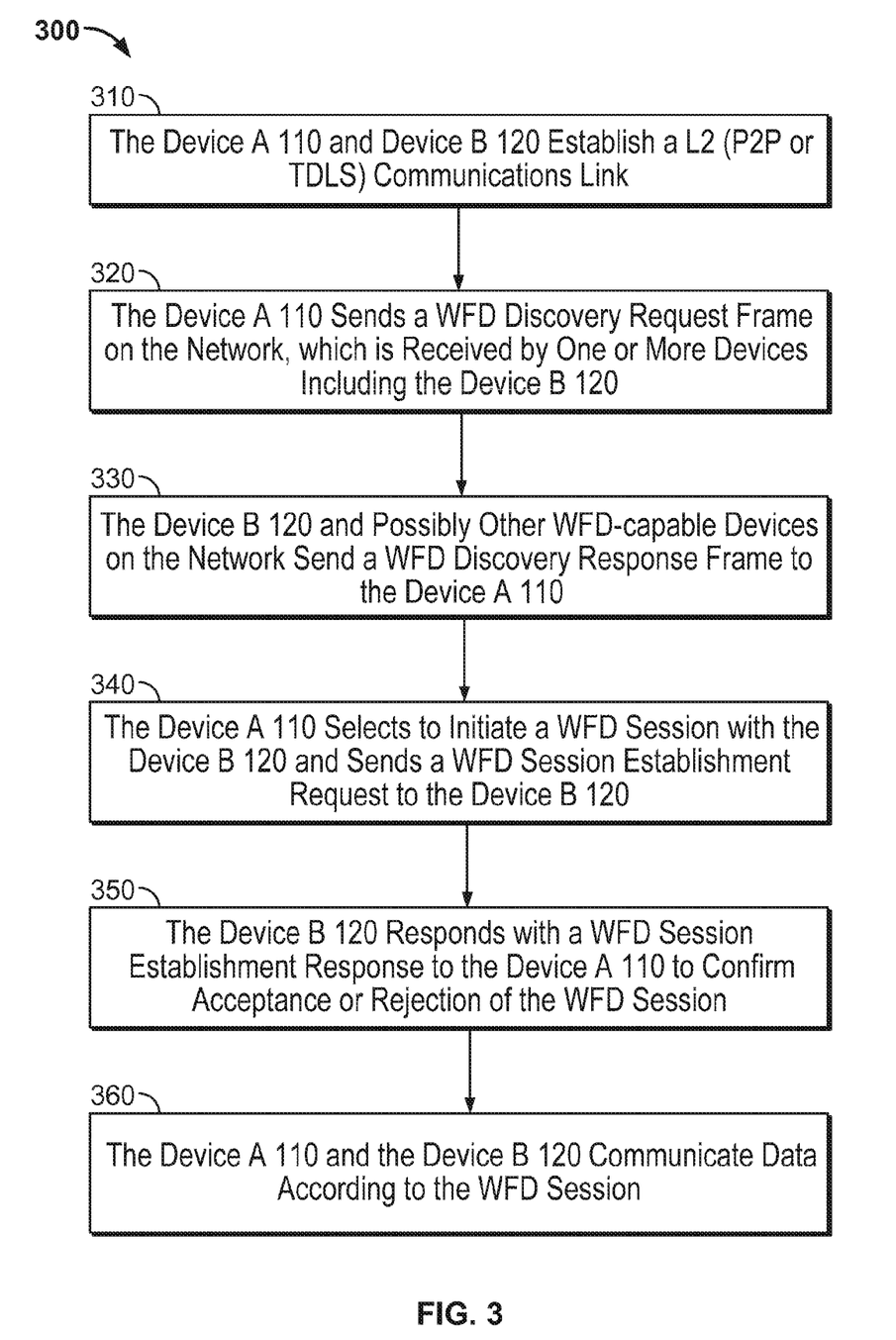
FIG. 3 depicts an illustrative process for establishing a WFD session over a L2 P2P or TDLS connection based on a WFD Discovery Request in accordance with an arrangement.

FIG. 3 depicts an illustrative process for establishing a WFD session over a L2 P2P or TDLS connection based on a WFD Discovery Request in accordance with an arrangement. At 310, the device A 110 and the device B 120 establish a L2 communication link between themselves. This link may be in the form of a P2P or TDLS communications link. In an arrangement, the P2P or TDLS communication link is established using a process identical or similar to that described by the stage 200 of FIG. 2. At 320, the device A 110 sends a WFD Discovery Request frame over the network. The WFD Discovery Request frame is received by one or more devices on the network, including the device B 120. In an arrangement, the device A 110 acts as a Wi-Fi display source and the device B 120 acts as Wi-Fi display sink. In another arrangement, the device A 110 acts as a Wi-Fi display sink and the device B 120 acts as Wi-Fi display source. Further, in some applications, the device A 110 and the device B 120 may each alternate between acting as a Wi-Fi display sink and a Wi-Fi display sink during a single communications session.

At 330, the device B 120, and possibly other WFD-capable devices on the network, send a WFD Discovery Response frame to the device A 110 in response to receiving the WFD Discovery Request frame. At 340, the device A 110 selects to initiate a WFD session with the device B 120 from among the number of devices for which a WFD Discovery Response frame was received (if the number if greater than one). In an arrangement, the device A 110 selects a device from among the number of devices for which a WFD Discovery Response frame was received based on a processing capability or some other capability of the devices. At 350, the device B 120 responds to the received WFD Discovery Response frame by sending a WFD Session Establishment Response to the device A 110. In particular, the WFD Session Establishment Response confirms acceptance or rejection of the proposed WFD session. Assuming that the WFD Session Establishment Response confirms acceptance of the WFD session, process 300 proceeds to 360, where data is communicated between the device A 110 and the device B 120 according to the WFD session.

In an arrangement, WFD Discovery Request and WFD Discovery Response frames are transmitted in the IEEE Public Action frame format as defined in standard 802.11k. The general format of the WFD Public Action frame in is shown in tables 1 and 2, below.

TABLE 1

General Format of WFD Public Action Frame.

| Field | Size (octets) | Value (Hexadecimal) | Description |
|---|---|---|---|
| Category | 1 | 0x04 | IEEE 802.11 public action usage. |
| Action field | 1 | 0x09 | IEEE 802.11 vendor specific usage. |

TABLE 1-continued

General Format of WFD Public Action Frame.

| Field | Size (octets) | Value (Hexadecimal) | Description |
|---|---|---|---|
| OUI | 3 | 50 6F 9A | WFA specific OUI. |
| OUI type | 1 | 0x0A (to be assigned) | Identifying the type or version of the WFD IE. Setting to 0x0A indicates WFA WFD v1.0 |
| OUI Subtype | 1 | | Identifying the type of WFD public action frame. The specific value is defined in table 2, below. |
| Dialog Token | 1 | | Set to a nonzero value to identify the request/response transaction. |
| Elements | Variable | | Including WFD IE or any information elements defined in IEEE standard 802.11-2007. |

TABLE 2

WFD Public Action Frame Type.

| Type | Notes |
|---|---|
| 0 | WFD Discovery Request |
| 1 | WFD Discovery Response |
| 2 | WFD Session Establishment Request |
| 3 | WFD Session Establishment Response |
| 4-255 | Reserved |

In particular, to generate a WFD Discovery Request Frame, the Dialog Token field is set to a nonzero value chosen by the device sending the WFD Discovery Request frame to identify the request/response transaction. The elements field in the WFD Discovery Request frame contains the WFD IE. The WFD subelements for a WFD IE that is included in the WFD Discovery Request frame are shown in table 3, below.

TABLE 3

WFD Subelements in the WFD Discovery Request Frame.

| Subelement | Subelement ID | Note |
|---|---|---|
| WFD Device Information | 0 | The WFD Device Information subelement shall be present in the WFD IE. |
| Coupled Sink Information | 6 | The Coupled Sink Information subelement shall be present in the WFD IE in the WFD Discovery Request frame transmitted by a WFD sink capable P2P device or a WFD sink capable TDLS device that supports coupled sink operation. |
| WFD Session Information | 9 | If the connectivity is P2P link, the WFD Session Information subelement shall be present in the WFD IE in the WFD Discovery Request frame transmitted by a WFD capable GO, when it has at least one associated client that is WFD capable. |
| Associated BSSID | 1 | If the connectivity is TDLS link, The Associated BSSID subelement shall be present in the WFD IE in the WFD Discovery Request frame transmitted by a WFD capable TDLS device, if the device is associated with an infrastructure AP or a GO and the device sets its PC field to 0b1 in WFD Device Information Subelement. |

To generate a WFD Discovery Request Frame, the Dialog Token field is set to a nonzero value received in the WFD Discovery Request frame to identify the request/response. The Elements field in the WFD Discovery Response frame contains a WFD IE and/or P2P IE. The WFD subelements for a WFD IE that is included in the WFD Discovery Response frame are shown in table 4, below.

TABLE 4

WFD Subelements in the WFD Discovery Response Frame.

| Subelement | Subelement ID | Note |
|---|---|---|
| WFD Device Information | 0 | The WFD Device Information subelement shall be present in the WFD IE. |
| Coupled Sink Information | 6 | The Coupled Sink Information subelement shall be present in the WFD IE in the WFD Discovery Response frame transmitted by a WFD sink capable P2P device or a WFD sink capable TDLS device that supports coupled sink operation. |
| WFD Session Information | 9 | If the connectivity is P2P link, the WFD Session Information subelement shall be present in the WFD IE in the WFD Discovery Response frame transmitted by a WFD capable GO, when it has at least one associated client that is WFD capable. |
| Associated BSSID | 1 | If the connectivity is TDLS link, The Associated BSSID subelement shall be present in the WFD IE in the WFD Discovery Response frame transmitted by a WFD capable TDLS device, if the device is associated with an infrastructure AP or a GO and the device sets its PC field to 0b1 in WFD Device Information Subelement. |

In an arrangement, a WFD IE is included in each WFD Discovery Request frame and WFD Discovery Response frame (and in beacon frames transmitted by WFD-enabled devices). The WFD IE generally includes information on various properties of the WFD devices capability, e.g., one or more of a display capability information, video profile information, audio profile information, transmission capability information, and three-dimensional capability information.

As an alternative sending a WFD Discovery Request frame, as described at 320 and 330 of the process 300, a WFD capable device may send a Service Discovery Request as described in relation to FIG. 4, below. In particular, the Service Discovery frame is used to locate WFD capable devices within a P2P group. The Service Discovery frame may be sent to a particular device or each of the devices within the P2P group. Prior to sending Service Discovery Request, sender of service discovery frame shall verify support for service discovery in the WFD device information. The recipient P2P device shall send Service Discovery Response with WFD attributes if WFD is supported.

Figure 4:
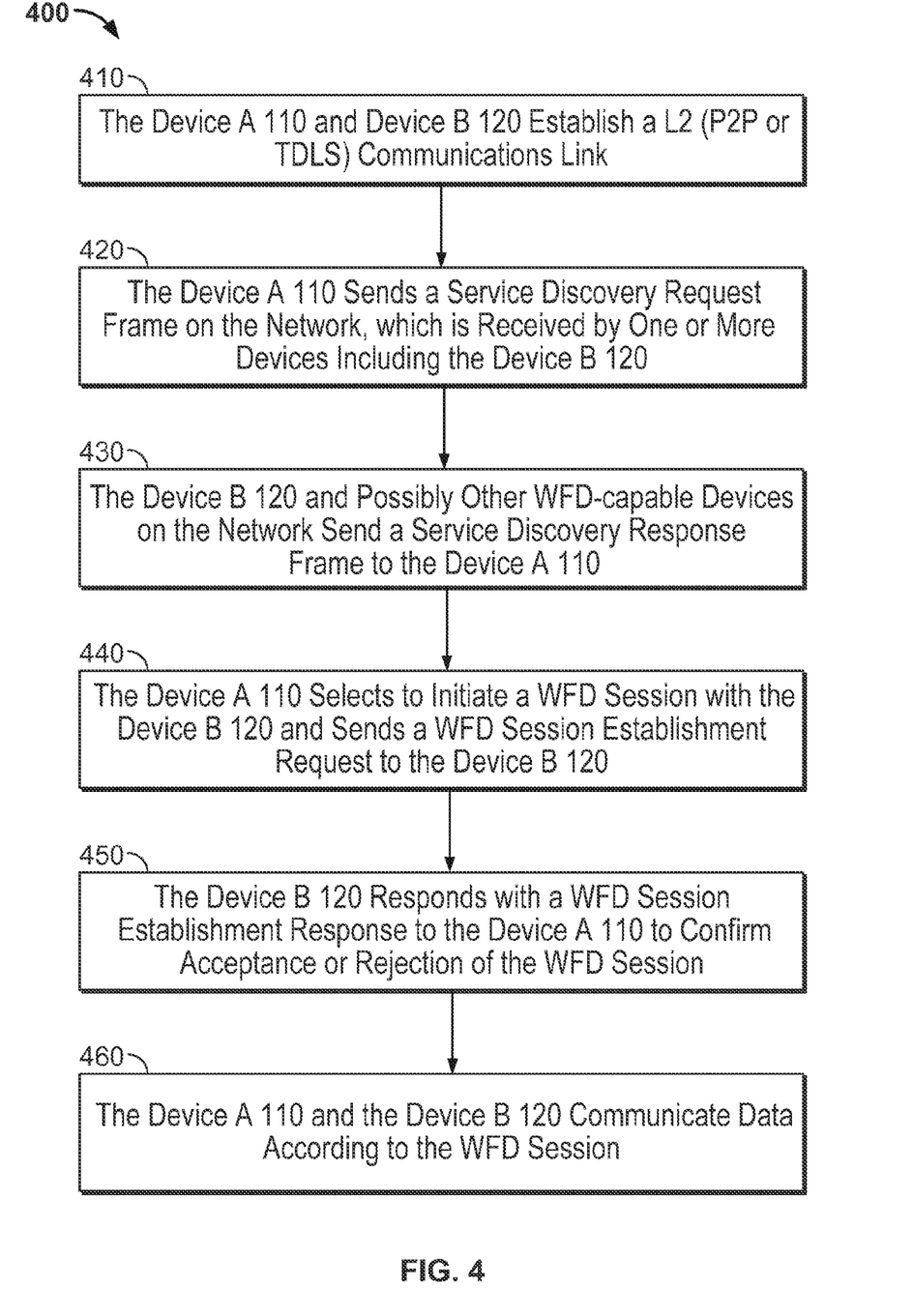
FIG. 4 depicts an illustrative process for establishing a WFD session over a L2 P2P or TDLS connection based on a Service Discovery Request in accordance with an arrangement.

FIG. 4 depicts an illustrative process for establishing a WFD session over a L2 P2P or TDLS connection based on a Service Discovery Request in accordance with an arrangement. At 410, the device A 110 and the device B 120 establish a L2 communication link between themselves. This link may be in the form of a P2P or TDLS communications link. In an arrangement, the P2P or TDLS communication link is established using a process identical or similar to that described by the stage 200 of FIG. 2. At 420, the device A 110 sends a Service Discovery Request frame over the network. The Service Discovery Request frame is received by one or more devices on the network, including the device B 120.

At 430, the device B 120, and possibly other WFD-capable devices on the network, send a Service Discovery Response frame to the device A 110 in response to receiving the Service Discovery Request frame. At 440, the device A 110 selects to initiate a WFD session with the device B 120 from among the number of devices for which a Service Discovery Request frame was received. In an arrangement, the device A 110 selects a device from among the number of devices for which a Service Discovery Response frame was received based on a processing capability, or some other capability, of the devices. Further, at 440, the device A 110 sends a WFD Session Establishment Request to the device B 120.

At 450, the device B 120 responds to the received WFD Session Establishment Request by sending a WFD Session Establishment Response to the device A 110. In particular, the WFD Session Establishment Response confirms acceptance or rejection of the proposed WFD session. Assuming that the WFD Session Establishment Response confirms acceptance of the WFD session, the process 400 proceeds to 460, where data is communicated between the device A 110 and the device B 120 according to the WFD session.

In an arrangement, the WFD Service Discovery Request and Response frames are transmitted in the frame format as described in the IEEE P802.11u standard, i.e., according to GAS Initiation Request and Response frame formats for P2P service discovery frames specified by that standard. According to the standard, support for service discovery is indicated in a Device Capability bitmap in the P2P IE and the support for WFD service discovery is indicated in a WFD Device Information subelement of the WFD IE.

In an arrangement, WFD Service Discovery is initiated if support for GAS protocol is present and the initiating WFD device advertises support for the GAS protocol. In particular, the WFD device uses an Advertise Protocol ID that is vendor specific. The contents with vendor specific protocol ID are based on the IEEE 802.11 7.3.2.26 format as described in table 5, below.

TABLE 5

WFD Service Discovery Frame Vendor Specific Content.

| Field | Size (octets) | Value (Hexadecimal) | Description |
|---|---|---|---|
| Tag | 1 | 0xDD | Vendor Specific Tag |
| Length | 1 | 0xXX | Length of Vendor Specific Tag. |

TABLE 5-continued

WFD Service Discovery Frame Vendor Specific Content.

| Field | Size (octets) | Value (Hexadecimal) | Description |
|---|---|---|---|
| OUI | 3 | 50 6F 9A | WFA specific OUI. |
| OUI type | 1 | 0x0A (to be assigned) | Identifying the type or version of the WFD IE. Setting to 0x0A indicates WFA WFD v1.0 |
| Elements | Variable | | WFD IEs as defined in WFD spec. |

In an arrangement, if the content in the WFD Service Discovery Response is too large for transmission (e.g., too many bytes), then GAS fragmentation is used to fragment the WFD Service Discovery Response prior to transmission.

With respect to the systems described by the process 300 and process 400, in an arrangement, the WFD Session Establishment Request frame is created by setting the Dialog Token field to a nonzero value chosen by the WFD-capable device that sends the WFD Session Establishment Request frame to identify the request/response transaction. The elements field in the WFD Session Establishment Request frame contains the WFD IE. The WFD subelements for a WFD IE that is included in the WFD Session Establishment frame are shown in table 6, below, in accordance with one arrangement

TABLE 6

WFD Subelements in the WFD Session Establishment Request Frame.

| Subelement | Subelement ID | Note |
|---|---|---|
| WFD Device Information | 0 | The WFD Device Information subelement shall be present in the WFD IE. |
| Coupled Sink Information | 6 | The Coupled Sink Information subelement shall be present in the WFD IE in the WFD Session Establishment Request frame transmitted by a WFD sink capable P2P device or a WFD sink capable TDLS device that supports coupled sink operation. |

With respect to the systems described by the process 300 and process 400, in an arrangement, the WFD Session Establishment Response frame is created by setting the Dialog Token field is set to a nonzero value chosen by the WFD-capable device sending the WFD Session Establishment Request frame to identify the request/response transaction. The elements field in the WFD Session Establishment Response frame contains the WFD IE. In an arrangement, the WFD IE includes the subelements in the WFD Session Establishment Request frame shown in table 7, below.

TABLE 7

WFD Subelements in the WFD Session Establishment Request Frame.

| Subelement | Subelement ID | Note |
|---|---|---|
| WFD Device Information | 0 | The WFD Device Information subelement shall be present in the WFD IE. |

TABLE 7-continued

WFD Subelements in the WFD Session Establishment Request Frame.

| Subelement | Subelement ID | Note |
|---|---|---|
| Coupled Sink Information | 6 | The Coupled Sink Information subelement shall be present in the WFD IE in the WFD Session Establishment Request frame transmitted by a WFD sink capable P2P device or a WFD sink capable TDLS device that supports coupled sink operation. |

Thus, described herein are systems and methods for invoking a L3 session (e.g., a WFD session) over an existing L2 connection (e.g., a P2P or TDLS connection) without performing a teardown process to terminate the existing L2 connection. The techniques described herein advantageously reduce a computational and temporal overhead required to initiate a L3 session when a L2 connection already exists.

The above described implementations are presented for the purposes of illustration and not of limitation. Other embodiments are possible and one or more parts of techniques described above may be performed in a different order (or concurrently) and still achieve desirable results. In addition, techniques of the disclosure may be implemented in hardware, such as on an application specific integrated circuit (ASIC) or on a field-programmable gate array (FPGA). The techniques of the disclosure may also be implemented in software.

What is claimed is:

1. A method for establishing an application layer communications session over a layer 2 (L2) communications connection, the method comprising:
    establishing the L2 communications connection over a local network between a first device and a second device, wherein the L2 communications connection is established for a purpose not related to the application layer communications session;
    transmitting, from the first device, a discovery request frame;
    receiving, at the first device, a discovery response frame transmitted from the second device in response to having received the discovery request frame; and
    establishing the application layer communications session between the first device and the second device while reusing the entire established L2 communications connection between the first device and the second device.

2. The method of claim 1, wherein the L2 communications connection is a peer-to-peer (P2P) communications connection.

3. The method of claim 1, wherein the L2 communications connection is a tunneled direct link setup (TDLS) communications connection.

4. The method of claim 1, wherein the application layer communications session is a WFD communications session.

5. The method of claim 1, wherein the discovery request frame is a WFD Discovery Request frame and the discovery response frame is a WFD Discovery Response frame.

6. The method of claim 5, wherein the WFD Discovery Response frame comprises a WFD Information Element (IE), the WFD IE describing at least one capability of the second device.

7. The method of claim 1, wherein the discovery request frame is a Service Discovery request frame and the discovery response frame is a Service Discovery response frame.

8. The method of claim 1, wherein the first device and the second device are each Wi-Fi enabled and WFD enabled.

9. The method of claim 1, wherein the first device acts as a Wi-Fi display source and the second device acts as a Wi-Fi display sink.

10. The method of claim 1, wherein the first device acts as a group owner (GO) of the application layer communications session.

11. A device for establishing an application layer communications session over a layer 2 (L2) communications connection, the device comprising:
    a processor configured to establish the L2 communications connection over a local network between the device and a client, wherein the L2 communications connection is established for a purpose not related to the application layer communications session;
    transmission circuitry configured to transmit a discovery request frame; and
    receiver circuitry configured to receive a discovery response frame transmitted from the client in response to the client having received the discovery request frame, wherein
    the processor is further configured to establish the application layer communication session between the device and the client while reusing the established L2 communications connection between the device and the client.

12. The device of claim 11, wherein the L2 communications connection is a peer-to-peer (P2P) communications connection.

13. The device of claim 11, wherein the L2 communications connection is a tunneled direct link setup (TDLS) communications connection.

14. The device of claim 11, wherein the application layer communications session is a WFD communications session.

15. The device of claim 11, wherein the discovery request frame is a WFD Discovery Request frame and the discovery response frame is a WFD Discovery Response frame.

16. The device of claim 15, wherein the WFD Discovery Response frame comprises a WFD Information Element (IE), the WFD IE describing at least one capability of the second device.

17. The device of claim 11, wherein the discovery request frame is a Service Discovery request frame and the discovery response frame is a Service Discovery response frame.

18. The device of claim 11, where the device and the client are each configured with Wi-Fi capability and WFD capability.

19. The device of claim 11, wherein the device is configured to act as a Wi-Fi display source and the client is configured to act as a Wi-Fi display sink.

20. The device of claim 11, wherein the device is configured to act as a group owner (GO) of the application layer communications session.

* * * * *